April 11, 1944.　　　A. DELAY　　　2,346,561
VACUUM FRUIT JUICE EXTRACTOR
Filed Sept. 11, 1941
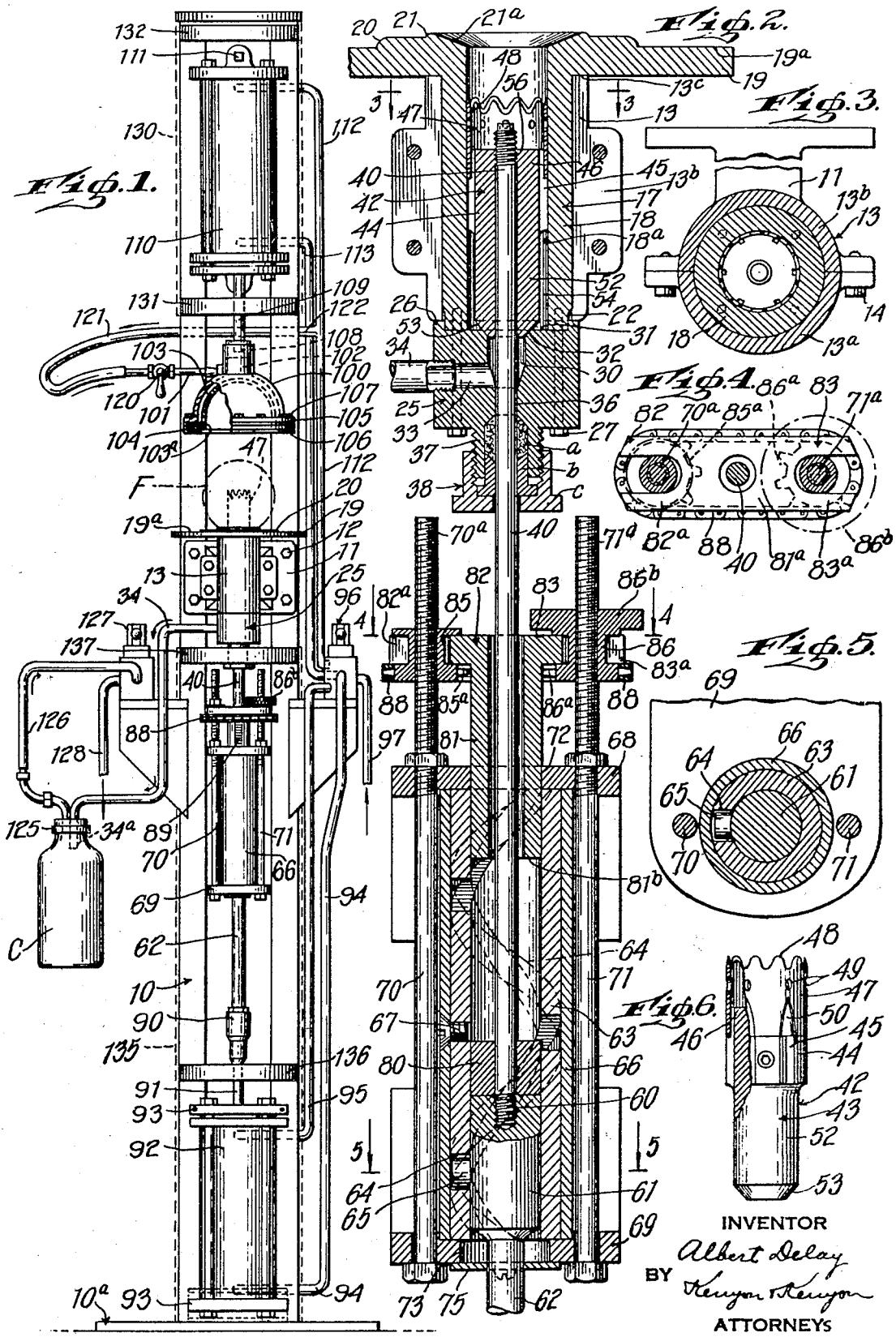
INVENTOR
Albert Delay
BY Kenyon & Kenyon
ATTORNEYS Patented Apr. 11, 1944

2,346,561

UNITED STATES PATENT OFFICE 2,346,561

VACUUM FRUIT JUICE EXTRACTOR

Albert Delay, Orlando, Fla.

Application September 11, 1941, Serial No. 410,362

10 Claims. (Cl. 100—50)

The present invention relates to apparatus for the extraction of juice particularly from citrus fruits such as oranges, lemons, grapefruit or other fruits similar thereto.

The juices from such fruits spoil quickly upon coming into contact with air. It is necessary, therefore, where the juices are to be bottled or canned to provide apparatus which will exclude air or other deleterious gases entirely from the fruit juices throughout the entire extraction and bottling or canning process. It is desirable, too, to avoid halving or otherwise cutting the fruit prior to actual extraction, so that there is no exposure of the juicy pulp to air at any time prior to or during juice extraction. In other words, it is desirable to provide apparatus for treating whole fruit in such a way that there is no exposure of the pulp or juice to air throughout the extraction and bottling of the juices.

It is an object of this invention to provide apparatus meeting the foregoing requirements.

Another object of this invention is to provide juice extracting apparatus which can readily be used for different sizes and kinds of fruit.

A further object is to provide novel adjustment means which facilitates quick adaptation of the apparatus for different kinds and sizes of fruit.

A further object is to provide means for completely enveloping whole fruit and sealing it to atmosphere prior to cutting through the fruit rind.

Still another object is to provide novel means for cutting into and for squeezing so enveloped fruit mechanically to extrude its juice and to remove it to bottling or canning apparatus at subatmospheric pressure or under vacuum in the absence of deleterious gases such as air.

A further object is to provide novel cutting and coring means for penetrating said fruit, and also to provide means for imparting rotary and reciprocal motion to said cutting and coring means.

To the accomplishment of the foregoing and such other objects as may hereinafter appear, this invention consists in the novel construction and arrangement of parts hereinafter described and then sought to be defined in the appended claims, reference being had to the accompanying drawing forming a part hereof and which shows, merely for the purposes of illustrative disclosure, a preferred embodiment of the invention, it being expressly understood, however, that various changes may be made in practice within the scope of the claims without digressing from the inventive idea.

In the drawing, in which similar reference characters denote corresponding parts:

Fig. 1 is a front elevation of the apparatus with parts thereof in sectional elevation to illustrate details of construction;

Fig. 2 is an enlarged vertical sectional view illustrating details of construction of the cutting and coring device and operating parts associated therewith;

Fig. 3 is a transverse sectional view taken along line 3—3 of Fig. 2 and viewed in the direction of the arrows;

Fig. 4 is a similar sectional view taken along line 4—4 of Fig. 2 and also viewed in the direction of the arrows;

Fig. 5 is a similar sectional view taken along line 5—5 of Fig. 2 and also viewed in the direction of the arrows; and Fig. 6 is a vertical elevation, partly in vertical section, to illustrate details of one form of cutter and corer device used in the apparatus.

In the drawing 10 denotes a suitable standard or upright frame having a base 10a. A bracket member 11 is suitably supported from the standard at 12. This bracket has a split bearing 13, one part 13a of which is removably attachable to the bracket supported part 13b as by bolts 14. The bracket member 11 is so supported that the axis of the bearing 13 is vertical. A citrus fruit seating member 17 is adapted to be supported in the bearing 13.

This seating member 17 comprises a tubular part 18 adapted to be clamped within the bearing 13. An annular flange 19 is provided on the seating member 18 which rests normally on the top edge 13c of the bearing 13. The upper face 19a of the flange is provided with an annular shoulder 20 for a purpose to be presently described, and with a second concentrically arranged annular shoulder 21. The surface of the flange is cut away within the limits defined by shoulder 21 and the inner wall 18a of the tubular part 18 to define a citrus fruit seat 21a shaped to receive citrus fruit F in substantial sealing relationship.

The tubular part 18 is slightly reduced in external diameter at 22 and attached to a combination valve seat and juice outlet member 25. This member 25 is provided on its top surface with an upright annular flange 26 whose internal diameter is so admeasured as to receive snugly the portion 22 of the tubular part 18. The member 25 and the tubular part 18 are removably attached to each other as by bolts 27. A substantially leak-proof joint is required between the two parts 18 and 25 and consequently their engaging surfaces are properly admeasured and finished to insure this effect.

A chamber 30 is provided within the member 25. This chamber opens into the top surface 31 of said member and is there provided with a valve seat 32 aligned with the axis of tubular part 18. A juice outlet passageway 33 communicates with the chamber 30. A suitable exhaust pipe line 34 open to vacuum, as will be presently described, is connected suitably to this passageway. Below the chamber 30, the member 25 has a bore 36 of reduced diameter aligned with the axis of tubular part 18.

On its lower face, the member 25 is provided with a threaded nipple 37 which receives the usual parts a, b, c of a packing gland or stuffing box 38 which serves to seal the chamber 30 against leakage of fluid therefrom around a reciprocally movable operating rod 40 which extends therethrough.

The rod 40 has a diameter so admeasured as to slidably and rotatably fit the bore 36. This rod extends through the member 25 and in its upper portion carries the cutter and corer member 42 (Figs. 2 and 6). The latter in the embodiment shown comprises a cylindrical body 43. This body has a portion 44 which is so admeasured in diameter as to fit slidably and rotatably within the bore 18a of the tubular part 18. The portion 44 is provided externally with suitable juice flues or grooves 45.

A reduced cylindrical portion 46 above the portion 44 receives a cylindrical tube or shell part 47 whose external diameter is substantially that of portion 44. The upper edge 48 of this part is sharpened, and in the embodiment shown, corrugated to facilitate rapid cutting into the fruit when the said edge is rotated and moved upwardly. This shell 47 is provided with a plurality of small juice escape openings 49. It also is provided with juice flues or grooves 50 arranged in alignment with the respective flues 45.

The portion 52 of the body 43, below portion 44, is of reduced diameter providing a substantial clearance 54 between itself and the inner wall 18a of the tubular portion 18 so that juices may flow freely therein toward the valve seat 32. A valve portion 53 is provided at the lower terminal of portion 52 and this normally seats upon the valve seat 32 preventing the passage of gases or the flow of juices to chamber 30 from above the valve 53. The overall height of the cutter and corer member 42 is so admeasured that when valve portion 53 is seated on seat 32, the cutting edge 48 lies below the citrus fruit seat 21a. The body 43 is bored axially to receive the rod 40 and threadedly engages the latter at 56. Other suitable means for removably attaching the body 43 to the rod may be provided.

The cutter and corer member 42 is adapted to be reciprocated and is rotated during its reciprocal motion by corresponding motion imparted to the rod 40. To this end, the rod 40 is coupled at 60 to a plunger portion 61 of a ramrod 62. The plunger portion 61 is movable axially in a tubular cam casing 63. This casing is provided in its wall with a spiral cam groove 64 in which a cam follower 65 attached to plunger portion 61 is movable. Casing 63 in turn is enveloped by a tubular housing 66 to which it is suitably fixed as by bolts 67.

End brackets 68, 69 are clamped over the respective ends of the housing 66 as by bolts 70, 71. These end brackets in turn are suitably secured to the standard or upright frame 10, thus serving to prevent either rotary or translatory motion of the cam casing 63. Both brackets 68 and 69 have the respective openings 72, 73 through which the rod 40 and ram rod 62 respectively may move. An end plate 75 fastened over the opening 73 limits the downward stroke of plunger portion 61.

With the structure just described, movement of the cam follower 65 in spiral groove 64 during reciprocation of rods 40 and 62 will impart rotation thereto and consequently to the cutter and corer 42.

It is desirable that the upper stroke limit of the cutter and corer 42 be adjustable. To this end, cutter depth adjustment means are provided. In the embodiment shown, this means includes a collar or sleeve member 80 carried on the shaft 40 within the cam casing 63. It also includes a tubular stop member 81 slidably arranged about the rod 40. This member 81 has a cross head 81a and oppositely extending tined flanges 82, 83 between whose pairs of tines 82a, 83a the respective threaded extentions 70a, 71a of bolts 70 and 71 extend. A nut 85 is rotatably borne on the tines 82a. A similar nut 86 is rotatably borne on the tines 83a. These nuts threadedly engage on the respective threaded extensions 70a, 71a of bolts 70, 71. The nuts 85, 86 have respective sprocket portions 85a, 86a and an endless sprocket chain 88 is passed around the two sprockets. One of the nuts, as nut 86, has a manipulating knob portion 86b to facilitate rotation. As a result of the chain and sprocket coupling between the nuts, rotation of knob 86b causes simultaneous rotation of both nuts on their respective threaded extensions 70a, 71a. The direction of rotation of the nuts thus determines the corresponding vertical movement of the stop member 81 and consequently the relative position of its inner or abutment end 81b. The latter provides the upper limiting abutment for the collar 80. Being adjustable as to position, as described, it permits variation in the stroke of the collar 80 and, consequently of plunger 61. As a result of such stroke limitation the maximum extent of projection of the cutter and corer 42 above the citrus fruit seat 21a and its depth of penetration into fruit F may be varied at will by simple manipulation of knob 86b.

For convenience, the stop member 81 may be provided with calibration marks 89 to indicate the extent of adjustment of the stroke and the penetration depth of the cutter and corer 42. Other suitable indicating means may, of course, be employed.

Reciprocal movement of the ram rod 62 is effected by attaching it rotatably through a suitable ball bearing coupling 90 to the piston rod 91 of a double acting pressure-actuated cylinder 92 of any well known type. This cylinder is suitably supported from the standard or upright frame 10 at 93. Pressure may be applied to either side of the cylinder piston (not shown) through the respective pressure pipe lines 94, 95 through the control valve 96 to which in turn the pressure line 97 from a suitable pressure source (not shown) is also connected.

To completely enclose and seal the fruit F from atmosphere during juice extraction a reciprocally movable enclosing dome 100 is provided. This dome which is closed at its top is provided with a pressure supply inlet 101 leading to a chamber 102 therein. An inverted cup-like member 103 of resilient material such as rubber or the like whose shape is complemental to that of chamber 102 is provided. This member has an annular flange 104 which is suitably secured to a similar annular flange 105 on the lower rim of the dome as by retaining rings 106 and bolting at 107. Sufficient clearance is provided between the inner wall of the dome and the wall of the member 103 to permit pressure supplied to chamber 102 from inlet 101 to act uniformly on all parts of the wall of resilient member 103. This provides means for automatically squeezing the fruit for juice extraction.

The dome is removably coupled at 108 to the piston rod 109 of a double acting pressure cylinder 110 of any well known type. This cylinder is suitably supported from the standard or upright frame 10 as at 111 in such a way that its piston rod 109 is in axial alignment with rods 40, 62 and 91. Pressure may be applied to either side of its piston (not shown) through the respective pressure pipe lines 112, 113 connected to pressure line 97 through the control valve 96.

The inlet 101 is connected through valve 120 to the pressure pipe line 121 which in turn is connected at 122 into the pressure pipe line 112.

The dome 100 and the resilient cup member 103 thereof are so admeasured in diameter and depth that when the dome is lowered by actuation of cylinder 110 over fruit F seated on the citrus seat 21a, they will completely envelope the said fruit. At the same time the rim 103a of the cup member 103, will then be pressed into sealing relationship with the annular shoulder 20 of flange 19 while resilient flange 104 will be pressed onto the top surface 19a of said flange 19.

The juice pipe line 34 from the combination valve seat and juice outlet member 25 is connected to a vacuum head 125 which is adapted in well known manner to be applied in removable sealing relationship over the mouth of a container C to be filled with extracted juices. An exhaust pipe line 126 also connected to the vacuum head 125 is connected through a control valve 127 to a vacuum pipe line 128 to some common form of vacuum pump or the like (not shown). The vacuum head 125 may be of any well known type used for filling and capping bottles. It may, for example, be of the type described and illustrated in Fig. 1 of Maull Patent No. 1,925,196 issued September 5, 1933. It serves to evacuate the container C and provide vacuum in the pipe line 34. Any other suitable form of vacuum head may of course be used.

Operation of the machine hereinabove described is as follows:

With the dome 100 in the raised position shown in Fig. 1 and the cutter and corer 42 in the retracted position shown in Fig. 2, the whole fruit F is placed on the citrus fruit seat 21a in the position shown in dot-dash line in Fig. 1. Valve 127 is then opened causing air to be exhausted from container C through pipe line 126 and simultaneously withdrawing air through pipe line 34 from the chamber 30 below the seated valve portion 53 of the cutter and corer 42. This valve 127 remains open throughout the sequence of operations now to be described.

Valve 96 is now manipulated to open pipe line 112 to pressure from the pipe line 97 while pipe line 113 is opened through the valve to a bleed line (not shown). This causes piston rod 109 of cylinder 110 to move downwardly toward the fruit, carrying with it the dome 100 whose cup 103 envelopes said fruit and seals it from atmosphere, as hereinabove described. Valve 96 is then further manipulated to open pipe line 94 to pressure from pipe line 97 while also maintaining pipe line 112 open to said pressure at the same time pipe line 95 is opened to said bleed line. Pressure in pipe line 94 moves piston rod 91 upwardly causing it to move the cutter and corer upwardly penetrating the fruit F with a rotary motion caused by the action of cam follower 65 in spiral groove 64. At this time valve 120 is also opened to pressure from the line 112. This pressure admitted to the chamber 102 tends to collapse the cup 103 around the fruit F causing it to squeeze the latter about the cutter and corer 42 at the same time that the latter is penetrating the fruit F. As soon as said cutter and corer 42 begins to move upwardly its valve portion 53 is lifted from its seat 32 opening the clearance 54 to the vacuum in chamber 30 and pipe line 34. This withdraws entrapped residual air above valve portion 53 and draws it through line 34 and out through pipe line 126. The extruded juices from the fruit then flow through the openings 49, passageways 50, and juice flues 45, through clearance 54, chamber 30, passageway 33, pipe line 34 and into the container C through the inwardly projecting stub 34a of said last named pipe line.

When all the juice has been extracted from the fruit F the valve 96 is operated in reverse direction to first operate cylinder 92 in reverse direction to cause retraction of piston rod 91. This is accomplished by operating valve 96 so as to open pipe line 95 to pressure from the line 97 while permitting the opposite end of said cylinder to bleed through pipe line 94 and the said bleed line (not shown). When the piston rod 91 is in completely retracted position the valve 53 of cutter and corer 42 is again seated on seat 32, again sealing chamber 30. Valve 96 is then operated further in reverse direction to open pipe line 113 to pressure from pipe line 97 while permitting the opposite end of cylinder 110 to bleed through the pipe line 112 and the bleed line (not shown). This causes retraction of the dome 100 raising it clear of the squeezed fruit which may then be removed and replaced by fresh fruit. During this retraction of the dome, pipe line 95 is maintained under pressure while pipe line 94 is open to the said bleed line. Valve 120 is also closed and the entire cycle just described repeated on each of the succeeding pieces of fresh fruit. When sufficient juice has been extracted from successive pieces of fruit to fill the container C, the latter is sealed suitably while vacuum is maintained in the pipe line 126.

With the apparatus of this invention, therefore, it is possible to perform a complete extraction of juice from a single piece of fruit or successive pieces of fruit substantially in vacuo without material access of air to the extracted juices at any time during the extraction. Moreover, since the fruit shell or rind is unbroken until after the fruit has been sealed under the dome 100, there is no access of air to the juicy pulp of the fruit at any time. Whatever air may be present in the clearance 54 or shell 41, is mostly withdrawn by suction through the line 34 as soon as valve portion 53 moves off its seat 32. This occurs before the cutting edge 48 bites into the rind of the fruit in the upward or penetrating stroke of the cutter and corer 42.

If the fruits whose juices are extracted vary in size the stroke of the cutter and corer may be quickly reduced or enlarged by manipulation of the penetration depth adjustment knob 86b.

If the dome 100 is too small for a particular size and kind of fruit it may be quickly removed and replaced by the required larger or smaller dome. Likewise the member 17 and/or cutter and corer 42 may be quickly replaced if necessary by other sized corresponding members.

The device is applicable, therefore, for the extraction of juices from such fruits as lemons, oranges or grapefruits without any changes other than the substitution of a properly sized dome, a suitably shaped and sized cutter and corer 42 and corresponding citrus fruit seat member 17.

For protection and appearance the cylinder 110 may be covered by a hood 130 indicated in dotted line extending between the hood supports 131, 132 carried on the standard 10. The stroke adjustment parts 66 and cylinder 92 may also be covered by a removable hood 135 indicated in dotted line and extending from the base 10a of standard 10 over the hood supports 136, 137 carried on said standard.

It is to be understood, too, that modifications in structure within the scope of the appended claims is contemplated. There is no intention of limitation to the exact details shown and described.

What is claimed is:

1. In a device for extracting fruit juice from whole fruit, support means having a seat for the reception of said whole fruit, enveloping means movable onto said so supported fruit for sealing it from atmosphere, pressure-actuated means for moving said enveloping means, mechanical means carried within said enveloping means for applying juice extruding pressure to said so enveloped fruit, movable means for penetrating said so enveloped fruit and for leading extruded juices therefrom, pressure-actuated means for imparting simultaneous rotary and longitudinal motion to said penetrating means, and means for withdrawing air from the enveloped fruit and for removing said extruded juices in the absence of deleterious gases.

2. In a device for extracting fruit juice from whole fruit, supporting means for said whole fruit, pressure-actuated means for enveloping and sealing said whole fruit from atmosphere on said supporting means, cutter and corer means for penetrating said enveloped fruit, pressure actuated means for reciprocating said cutter and corer means, means for rotating said cutter and corer means during its reciprocation, and means for adjusting the extent of penetration of said enveloped fruit by said cutter and corer means.

3. In a device for extracting fruit juice from whole fruit, supporting means for said whole fruit, pressure-actuated means for enveloping and sealing said whole fruit from atmosphere on said supporting means, cutter and corer means for penetrating said enveloped fruit, pressure actuated means for reciprocating said cutter and corer means, means for rotating said cutter and corer means during its reciprocation, means for withdrawing extracted juice from said penetrated and enveloped fruit in the absence of deleterious gases and at sub-atmospheric pressure, and means for adjusting the extent of penetration of said enveloped fruit by said cutter and corer means.

4. In a device for extracting fruit juice from whole fruit, supporting means for said whole fruit, pressure-actuated means for enveloping and sealing said whole fruit from atmosphere on said supporting means, cutter and corer means for penetrating said enveloped whole fruit, pressure-actuated means for reciprocating said cutter and corer means, means for rotating said cutter and corer means during its reciprocation, means for withdrawing extracted juice from said penetrated and enveloped fruit in said device in the absence of deleterious gases and at sub-atmospheric pressure and valve means controlled by movement of said cutter and corer means and operating in timed relationship with respect to the penetration of said whole fruit by said cutter and corer means to permit withdrawal of deleterious gases through said juice withdrawing means prior to said penetration.

3. In a device for the extraction of fruit juice from whole fruit, support means having a seat for the reception of said fruit, a dome movable reciprocally toward and away from said support means, pressure-actuated means for so moving said dome, resilient means within said dome for enveloping whole fruit carried on said seat and engaging in sealing relationship with said support means to seal said fruit to atmosphere, means for applying fluid pressure to said resilient means for squeezing said enveloped fruit, pressure-actuated means for penetrating said enveloped fruit and for leading juices squeezed therefrom, and means for removing said so led juices in the absence of deleterious gases and at sub-atmospheric pressure.

6. In a device for extracting fruit juices from whole fruit, a citrus seat member for receiving said whole fruit, cutter and corer means movable in said member for penetrating said whole fruit, pressure-actuated means for reciprocating said cutter and corer means, spiral cam controlled means for automatically rotating said cutter and corer during its reciprocation, dome means for enveloping said whole fruit, pressure-actuated means for reciprocating said dome means and moving it into and out of sealing engagement with said seat member, pressure-actuated means within said dome means for squeezing said enveloped fruit to extrude its juice and means for withdrawing said extruded juice in the absence of deleterious gases.

7. In a device of the character described, cutter and corer means for penetrating whole fruit, means for reciprocating said cutter and corer means, spiral cam controlled means for automatically rotating said cutter and corer means during its reciprocation, an adjustably movable stop member in the path of travel of a part associated with said reciprocating means, threaded members, nut members having sprocket portions carried on said threaded members, an endless member extending around said sprocket portions for rotatively coupling said nut members together, and means on said stop member engaging said nut members for changing the position of said adjustably movable stop member on rotation of said nut members whereby adjustment of the depth of penetration of said cutter and corer means may be effected.

8. In a device of the character described, a citrus seat member adapted to receive whole fruit, cutter and corer means for penetrating said whole fruit reciprocally movable in said member and outwardly thereof in its feed stroke and means for imparting reciprocating motion to said cutter and corer means, said cutter and corer means comprising a solid portion and a shell portion having a corrugated cutting edge, juice flues arranged in said shell portion and a portion of said solid portion of said cutter and corer means adjacent to said shell portion and a valve in another portion of said solid portion of said cutter and corer means, a juice outlet member having a valve seat on which said valve may seat in the retracted position of said cutter and corer means and suction means connected to said juice outlet member for withdrawing deleterious gases and fruit juice through said juice outlet member when said valve is unseated.

9. In a device of the character described, cutter and corer means for penetrating whole fruit, means for reciprocating said cutter and corer means, spiral cam-controlled means for automatically rotating said cutter and corer means during its reciprocation, an adjustably movable stop member in the path of movement of a part associated with said reciprocating means, threaded stationary members, nut members carried on said threaded members, an endless member extending around portions of said nut members for rotatively coupling them together, and means on said stop member engaging said nut members for changing the position of said adjustably movable stop member on rotation of said nut members, whereby adjustment of the depth of penetration of said cutter and corer means may be effected.

10. In a device of the character described, cutter and corer means for penetrating whole fruit, means for reciprocating said cutter and corer means, means for automatically rotating said cutter and corer means during its reciprocation, an adjustably movable tubular stop member through which a portion of said reciprocating means extends lying in the path of movement of a part of said reciprocating means, threaded stationary members, nut members having sprocket portions carried on said threaded members and grooved portions, an endless chain passed around said sprocket portions for rotatively coupling said nut members together, and tined portions on said stop member engaging in said grooved portions of said nut members for changing the position of said stop member on rotation of said nut members whereby adjustment of the depth of penetration of said cutter and corer means may be effected.

ALBERT DELAY.

CERTIFICATE OF CORRECTION.

Patent No. 2,346,561. April 11, 1944.

ALBERT DELAY.

It is hereby certified that error appears in the printed specification of the above numbered patent requiring correction as follows: Page 4, second column, line 12, for the claim number "3" read --5--; and that the said Letters Patent should be read with this correction therein that the same may conform to the record of the case in the Patent Office.

Signed and sealed this 4th day of July, A. D. 1944.

Leslie Frazer (Seal) Acting Commissioner of Patents.